(12) United States Patent
Ding et al.

(10) Patent No.: US 12,666,154 B1
(45) Date of Patent: Jun. 23, 2026

(54) DYNAMIC ROI SIZES FOR CAMERA AUTO EXPOSURE

(71) Applicant: Snap Inc., Santa Monica, CA (US)

(72) Inventors: Bo Ding, Boulder, CO (US); Emil Ekmecic, Santa Monica, CA (US); Dunxu Hu, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/798,374

(22) Filed: Aug. 8, 2024

Related U.S. Application Data

(60) Provisional application No. 63/578,248, filed on Aug. 23, 2023.

(51) Int. Cl.
*H04N 23/73* (2023.01)
*H04N 23/611* (2023.01)
*H04N 23/72* (2023.01)

(52) U.S. Cl.
CPC ........... *H04N 23/73* (2023.01); *H04N 23/611* (2023.01); *H04N 23/72* (2023.01)

(58) Field of Classification Search
CPC ....... H04N 23/73; H04N 23/611; H04N 23/72
USPC ...................................................... 348/229.1
See application file for complete search history.

(56) References Cited

U.S. PATENT DOCUMENTS

| | | | | | |
|---|---|---|---|---|---|
| 6,778,180 | B2 * | 8/2004 | Howard | .................... | G06T 7/20 |
| | | | | | 345/581 |
| 7,990,422 | B2 * | 8/2011 | Ahiska | ............. | G08B 13/19643 |
| | | | | | 348/211.3 |
| 8,405,732 | B2 * | 3/2013 | Ahiska | ................... | H04N 7/181 |
| | | | | | 348/211.3 |
| 8,494,357 | B2 | 7/2013 | Brunner | | |
| 10,440,284 | B2 * | 10/2019 | Sen | ........................ | H04N 23/73 |
| 11,588,980 | B2 | 2/2023 | Ramsay | | |
| 2007/0076947 | A1 * | 4/2007 | Wang | ................... | G06V 40/162 |
| | | | | | 348/E9.04 |
| 2007/0076957 | A1 * | 4/2007 | Wang | ................... | G06V 40/162 |
| | | | | | 375/E7.182 |
| 2015/0207993 | A1 * | 7/2015 | Kato | ....................... | H04N 5/907 |
| | | | | | 348/221.1 |
| 2016/0381271 | A1 * | 12/2016 | Cheng | .................... | F16M 13/04 |
| | | | | | 348/208.2 |
| 2017/0310901 | A1 * | 10/2017 | Sheikh | ............... | H04N 23/6811 |
| 2018/0012078 | A1 * | 1/2018 | Pournaghi | ................. | G06T 7/77 |
| 2019/0007690 | A1 * | 1/2019 | Varadarajan | ........... | G06V 20/46 |
| 2019/0138793 | A1 * | 5/2019 | Rodriguez | ............. | H04N 23/73 |
| 2022/0021800 | A1 | 1/2022 | Itoh | | |

(Continued)

*Primary Examiner* — Usman A Khan
(74) *Attorney, Agent, or Firm* — Schwegman Lundberg & Woessner, P.A.

(57) ABSTRACT

A system is disclosed, including a processor and a memory. The memory stores instructions that, when executed by the processor, configure the system to perform operations. Raw region of interest (ROI) information is obtained, identifying a raw ROI having a raw ROI size, within a first video frame captured by a camera. Motion information representative of motion of the raw ROI relative to a field of view (FOV) of the camera is obtained. The raw ROI information and the motion information are processed to generate a dynamic ROI having a dynamic ROI size larger than the raw ROI size. A second video frame is captured by the camera. A portion of the second video frame defined by the dynamic ROI is processed to generate autoexposure (AE) settings for the camera.

20 Claims, 10 Drawing Sheets

(56)        References Cited

U.S. PATENT DOCUMENTS

2022/0172509 A1     6/2022  Rodriguez
2023/0419505 A1*   12/2023  Tang ..................... H04N 23/73

* cited by examiner

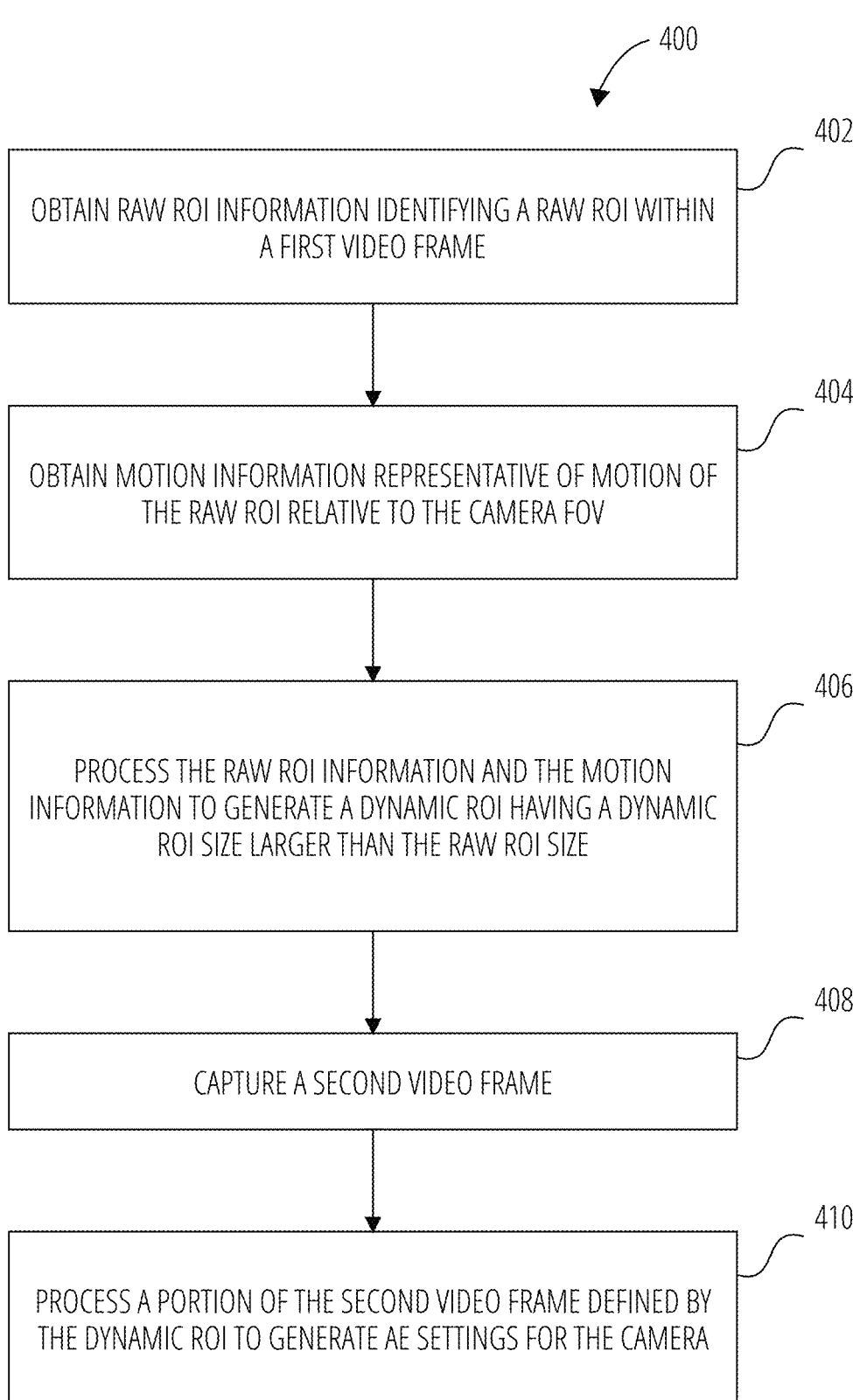

400

402

OBTAIN RAW ROI INFORMATION IDENTIFYING A RAW ROI WITHIN A FIRST VIDEO FRAME

404

OBTAIN MOTION INFORMATION REPRESENTATIVE OF MOTION OF THE RAW ROI RELATIVE TO THE CAMERA FOV

406

PROCESS THE RAW ROI INFORMATION AND THE MOTION INFORMATION TO GENERATE A DYNAMIC ROI HAVING A DYNAMIC ROI SIZE LARGER THAN THE RAW ROI SIZE

408

CAPTURE A SECOND VIDEO FRAME

410

PROCESS A PORTION OF THE SECOND VIDEO FRAME DEFINED BY THE DYNAMIC ROI TO GENERATE AE SETTINGS FOR THE CAMERA

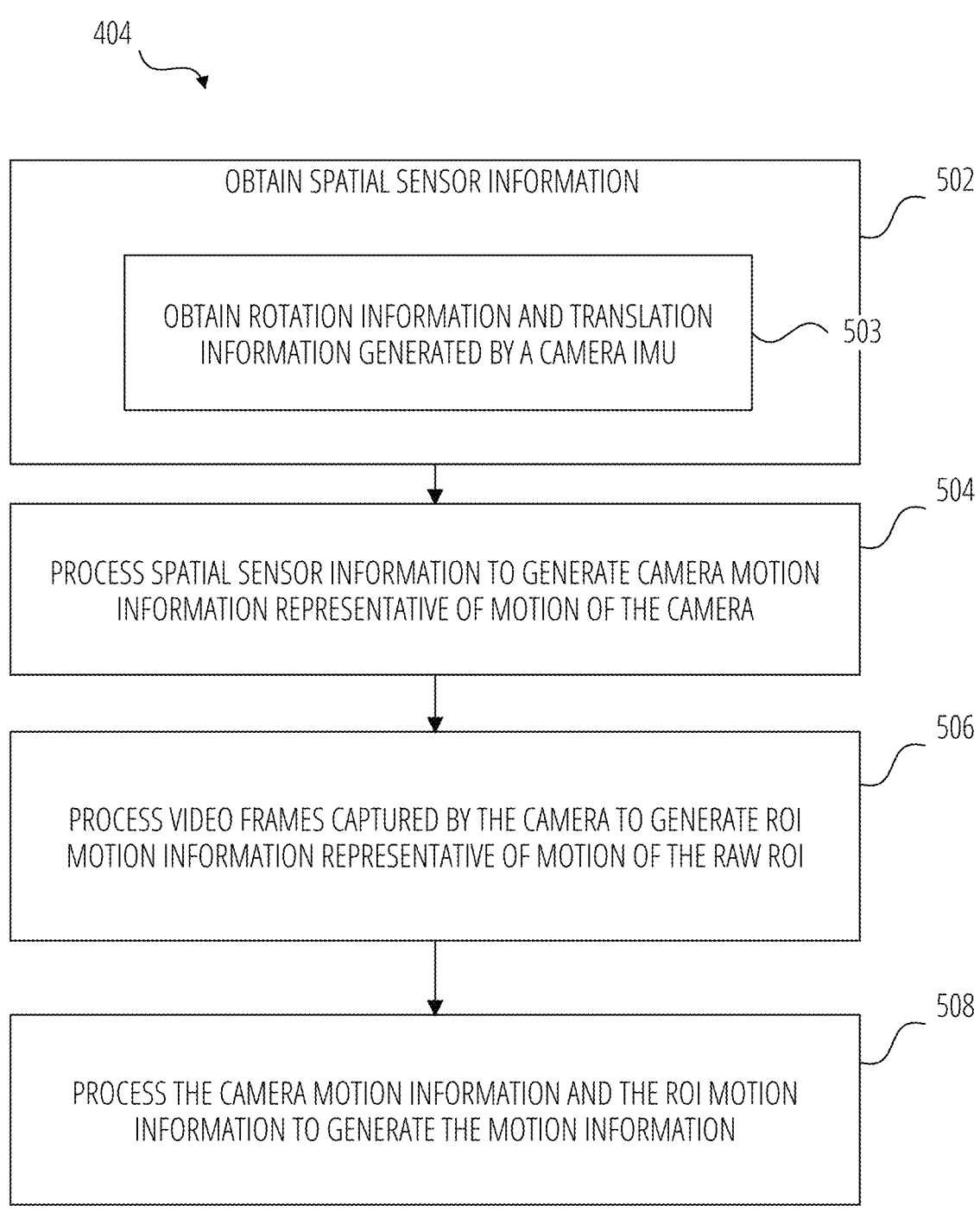

OBTAIN SPATIAL SENSOR INFORMATION                                        502

OBTAIN ROTATION INFORMATION AND TRANSLATION
INFORMATION GENERATED BY A CAMERA IMU                          503

PROCESS SPATIAL SENSOR INFORMATION TO GENERATE CAMERA MOTION
INFORMATION REPRESENTATIVE OF MOTION OF THE CAMERA             504

PROCESS VIDEO FRAMES CAPTURED BY THE CAMERA TO GENERATE ROI
MOTION INFORMATION REPRESENTATIVE OF MOTION OF THE RAW ROI          506

PROCESS THE CAMERA MOTION INFORMATION AND THE ROI MOTION
INFORMATION TO GENERATE THE MOTION INFORMATION                     508

FIG. 5

DYNAMIC ROI SIZES FOR CAMERA AUTO EXPOSURE

CROSS-REFERENCE TO RELATED APPLICATION

This patent application claims the benefit of U.S. Provisional Patent Application No. 63/578,248, filed Aug. 23, 2023, entitled "DYNAMIC ROI SIZES FOR CAMERA AUTO EXPOSURE", which is incorporated by reference herein in its entirety.

TECHNICAL FIELD

The present disclosure relates generally to camera autoexposure and more particularly to dynamically changing the sizes of regions of interest within an image used for computing autoexposure settings for a camera.

BACKGROUND

Autoexposure ("AE", also referred to as "auto exposure" or "auto-exposure") refers to a function or mode of a camera system in which the camera system automatically calculates and adjusts exposure settings based on light entering the camera aperture. Autoexposure features of a camera system may attempt to avoid under- or over-exposure of subjects visible within the camera's field of view.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 4 is a flowchart showing operations of an example method for performing AE for a camera system, according to some examples.

FIG. 5 is a flowchart showing sub-operations of an example operation for obtaining motion information in the method of FIG. 5, according to some examples.

DETAILED DESCRIPTION

Figure 1:
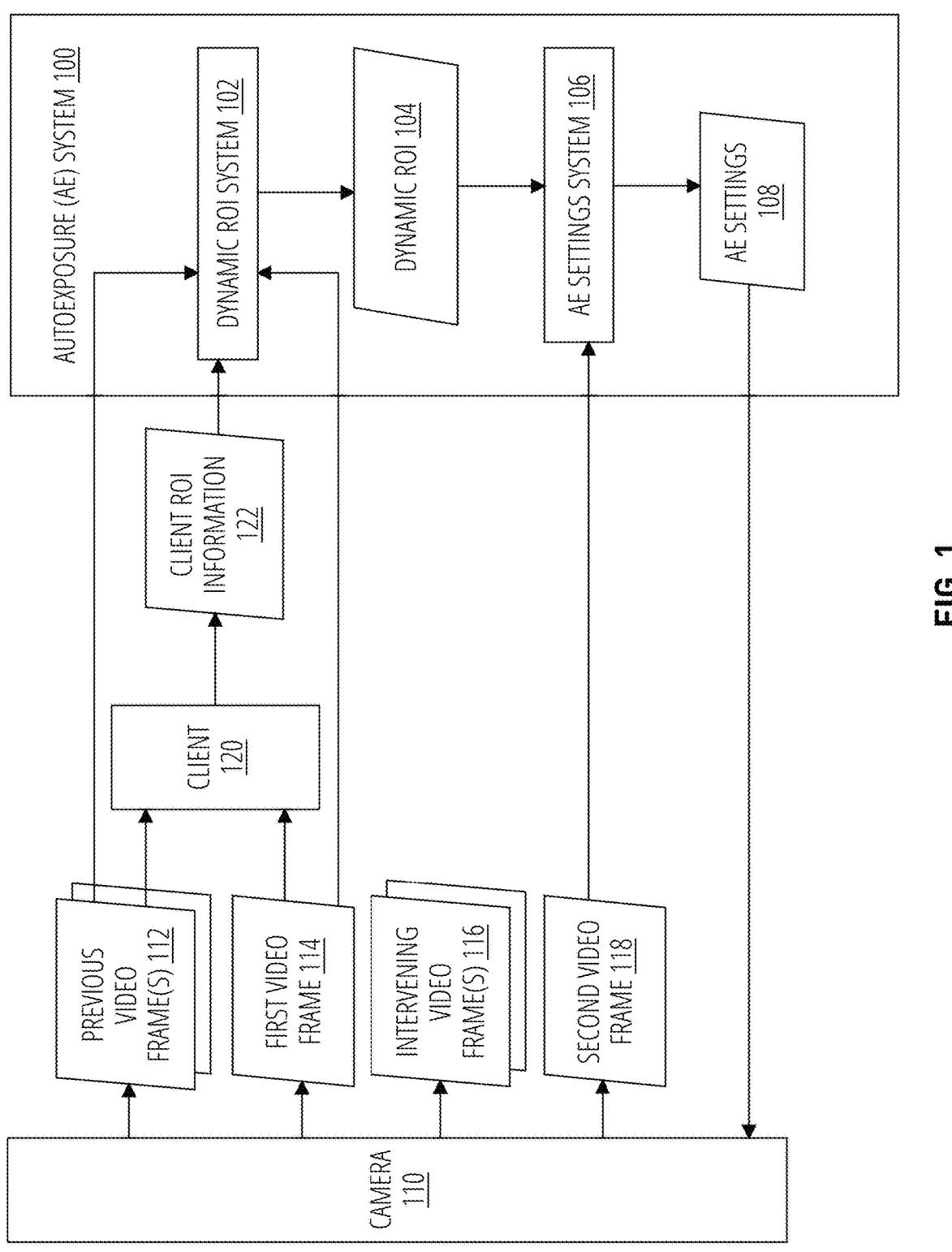
FIG. 1 is a block diagram of an AE system configured to perform AE for a camera system, according to some examples.

Automatically computing exposure settings for a camera presents certain technical problems. A conventional approach to AE is to measure the luma, luminance, or other measure of brightness across an entire image captured by the camera, and compute the AE setting for the camera based on the brightness measurements. However, in systems supporting multiple different tasks or processes, such as multiple different software clients and/or hardware components or processes (collectively referred to herein as "clients"), the computation of AE settings based on an image captured by the selected camera is not straightforward. For example, if a first client is configured to gather visual information regarding a first object in an environment, and a second client is configured to gather visual information regarding a second object in the environment, a sub-optimal computation of AE settings may result in the first object and/or second object being either under- or over-exposed in subsequent images captured by the camera. In a worst-case scenario, all of the objects of interest (e.g., the first object and second object) may be either underexposed or overexposed in the images captured by the camera. Thus, it may be beneficial to provide techniques to improve the chance that a given object of interest (or other region of interest in an image) is well exposed (i.e., neither overexposed nor underexposed) in the images captured by the camera.

In some examples described herein, objects of interest within a camera's field of view (FOV) may be tracked over a time series of one or more images (e.g., a video stream including a temporal sequence of video frames), and one or more regions of interest (ROIs) may be defined based on the locations of the tracked objects within the camera's FOV. The AE settings for the camera (e.g., exposure time and image sensor gain) may be computed based on metering of the brightness of the ROIs within the images captured by the camera, thereby potentially improving exposure of the objects of interest. For example, an ROI defined based on the location of a first object of interest within the image (e.g., a bounding box around a user's face) may be used to compute AE settings for the camera, thereby potentially improving the exposure of the object of interest (e.g., the face) in subsequent images (e.g., subsequent video frames in a video stream) captured by the camera. Improvements to exposure may in turn improve the operation of clients seeking to recognize, track, or otherwise attend to the objects of interest (e.g., a face recognition client).

However, defining ROIs within a time series of images may be difficult when the image content is not static over time. A camera capturing a continuous time series of images adjusts the AE settings of the camera system based on images already captured, but in a dynamic and changing environment, previously-captured images do not necessarily enable accurate prediction of the location where an object of interest will be in subsequent captured images. Due to the working nature of image sensors used by cameras (e.g., rolling shutter image sensors) and of AE systems used to compute AE settings based on captured image content, there may be a non-negligible latency (e.g., several milliseconds or longer) between capturing a first image, identifying ROIs within the first image, computing AE settings based on analysis of the ROIs of the first image, adjusting the image sensor's gain and exposure time based on the computed AE settings, and capturing a subsequent image in the time series using the newly-computed AE settings. In some examples, this latency period could be long enough that one or more additional images could be captured before new ROIs can be defined and new AE settings computed. During this latency period, the object(s) of interest could move, and/or the camera could move relative to the object(s) of interest. If such movement occurs, an inaccurate ROI may be applied to the subsequent captured image, potentially yielding an inaccurate exposure of the object of interest being tracked by the ROI. In some cases, this inaccuracy could in turn adversely affect the definition of the ROI in subsequent images, potentially resulting in the client tracking the object of interest being unable to track the object with sufficient accuracy to define an accurate ROI for the object of interest and/or a client processing the images of the object of interest being unable to accurately perform its processing task. Thus, it may be beneficial to define the ROIs used for AE to reduce the adverse effect of motion of the object of interest and/or motion of the camera.

Accordingly, in some examples described herein, one or more ROIs used by an AE system may be dynamically sized to compensate for motion of the ROIs and/or motion of the camera. In some examples, the raw ROIs defined for one or more previously-captured images (e.g., one or more bounding boxes defined by one or more clients) are processed to compute a ROI motion speed for each ROI based on relative location differences of the raw ROIs between the previous frames. Based on the ROI motion speed of a given raw ROI, and the raw ROI's location (e.g., pixel coordinates) within the most recently captured image, a dynamic ROI size and dynamic ROI location are associated with the ROI in the current captured image.

In addition, in some examples, motion of the camera may be detected using camera motion information generated by one or more spatial sensors (e.g., an inertial measurement unit (IMU) integrated into or coupled to the camera system). The spatial sensors may be configured to move together with the camera system to measure camera movement, e.g., to measure 6 degrees of freedom (3 degrees of rotation, 3 degrees of translation) of motion of the camera system. In some examples, the spatial sensors (e.g., IMU) have a higher sampling frequency (e.g., hundreds of samples per second) than the frame rate at which the camera captures images (e.g., 30 or 60 frames per second), and the spatial data generated by the spatial sensors may be synchronized with the timing of the images in the time series, thereby placing them on the same time scale. The raw output of the spatial sensors may be converted to motion vectors to assist in processing. The AE system may access these motion vectors to obtain motion information for the camera system (e.g., camera system translation and rotation speed). By processing the motion information, the dynamic ROI size and/or dynamic ROI location of each ROI can be re-calculated or otherwise adjusted to potentially achieve better ROI exposure.

Other technical features may be readily apparent to one skilled in the art from the following figures, descriptions, and claims.

Examples described herein provide an AE system and method that tracks regions of interest (ROIs) in the video frames captured by a camera and computes AE settings for the camera based on the video frames captured by the camera and the ROIs present within the captured video frames. Some examples may thereby attempt to address one or more technical problems presented by AE for camera systems. In some examples, ROI motion may be tracked over two or more video frames, and the ROI may be increased in size based on an overall degree of movement of the ROI, thereby improving the chance that an object of interest will be included inside the ROI in subsequent frames even if the object of interest changes direction. In some examples, camera motion may be tracked using spatial sensor data (e.g., IMU data) at the hardware level, thereby providing an efficient and accurate measure of camera movement for the purpose of dynamic ROI sizing. In some examples, a computationally simple brightness measurement technique is applied to ROIs of a video frame captured by the camera, potentially reducing the computational load generated by the AE system (which may operate at a high frame rate and/or with a limited computational budget). In some examples, the AE system is agnostic as to the nature and/or importance of ROIs identified by various clients; by providing a layer of abstraction between the clients (which generate the ROIs) and the AE system, the camera system may provide a flexible, modular design that allows individual clients to be designed that define their ROIs according to the specific needs of that client, while the AE system dynamically resizes the ROIs as needed to accomplish effective AE without regard to the specific needs of each client.

FIG. 1 shows a block diagram of an AE system 100 configured to perform AE for a camera 110 of a camera system. A skilled artisan will readily recognize that various additional functional components may be supported by the AE system 100 to facilitate additional functionality that is not specifically described herein. The various functional components depicted in FIG. 1 may reside on a single computing device or may be distributed across several computing devices in various arrangements such as those used in cloud-based architectures.

In some examples, the camera system may be incorporated into a mobile device, such as a smartphone or tablet, equipped with multiple cameras. In some examples, the camera system may be incorporated into a wearable device, such as a head-mounted display (HMD) or XR (extended reality) display equipped with multiple cameras. In some examples, the camera system may be incorporated into an autonomous driving system of a vehicle equipped with multiple cameras to model and understand the vehicle's environment. An example machine 900 is described below with reference to FIG. 9, which may provide a machine architecture or a system architecture incorporating a camera system having an AE system as described herein. In some examples, a system or device including a camera system having an AE system as described herein may use a software architecture as described with reference to FIG. 10 below.

The AE system 100 is configured to obtain various types of information in order to perform AE. The AE system 100 processes its data inputs to generate AE settings 108, such as a gain (e.g., for an image sensor) and/or an exposure time. The AE settings 108 are used to configure the camera 110.

The AE system 100 may receive information from a camera 110, such as various video frames. The camera 110 may be any type of sensor capable of capturing image data. For example, the camera 110 may be a camera, such as a color camera, configured to capture images and/or video. In the illustrated example, the camera 110 is configured to capture a time series of images, which may be referred to herein as video frames. As used herein, the term "capture" in reference to an image, such as a video frame, captured by a camera, refers to, for example, an image which is observed by the image sensor of the camera and made available for transmission or processing by other components, without the image necessarily being stored to a memory or otherwise stored or copied. As used herein, the terms "image" and "video frame" will be used interchangeably to refer to images captured in time series by a camera. A time series of images captured by a camera may be referred to herein as a video stream.

The time series of images shown in FIG. 1 includes, in chronological order: first, a first plurality of video frames including one or more previous video frame(s) 112 and a first video frame 114; next, one or more intervening video frame(s) 116; and finally, a second video frame 118. The previous video frame(s) 112 may include one or more video frames in time series, which may be consecutive video frames of a video stream or may be non-consecutive but temporally ordered samples from a video stream. The previous video frame(s) 112 and first video frame 114, jointly referred to herein as a first plurality of video frames, are used in some examples to compute or otherwise generate ROI motion information representative of motion of one or more ROIs identified within one or more of the first plurality of video frames. The intervening video frame(s) 116 are captured by the camera during a time period in which the ROIs from the first plurality of video frames are being identified and generated by the client(s) and/or the AE system 100, as described below. Finally, the second video frame 118 is captured by the camera and used, in combination with one or more ROIs generated by the AE system 100, for brightness metering to generate the AE settings 108 to be used in configuring the camera 110.

It will be appreciated that, in some examples, the frame rate at which the camera captures new video frames may be low enough, relative to the speed with which the ROIs are generated, that no intervening video frame(s) 116 are captured by the camera before the second video frame 118 is captured. However, in some examples, at least one additional video frame (e.g., intervening video frame(s) 116) is captured by the camera after the first video frame 114 and before the second video frame 118 due to the speed of generating the dynamic ROIs relative to the frame rate of the camera.

The camera system may include and/or communicate with one or more clients, as described above, each of which may generate client ROI information identifying one or more client ROIs (e.g., raw ROIs, as described below) of interest to the client. In some examples, the client ROI information may also include information characterizing the client ROIs, such as ROI size information identifying a size (e.g., horizontal and vertical pixel dimensions) of the ROI, ROI location information identifying a location of the ROI (e.g., pixel coordinates of a corner or other reference point of the ROI) within a camera's FOV or within a video frame captured by a camera, and/or ROI weight information characterizing weights to be applied to the ROI or various locations within the ROI. In some examples, the ROI size information and ROI location information may be generated by, and/or received from, the client as a raw ROI size 202 and a raw ROI location 204, respectively, as described below with reference to FIG. 2. In FIG. 1, a single client 120 is shown to generate client ROI information 122.

After computing the AE settings 108, the computed AE settings 108 may be used to configure the camera 110, and in some examples may also be stored and/or transmitted for other purposes.

The illustrated AE system 100 includes two subsystems: a dynamic ROI system 102 and an AE settings system 106. The dynamic ROI system 102 processes the client ROI information 122 and the first plurality of video frames (e.g., previous video frame(s) 112 and first video frame 114) to generate a dynamic ROI 104 having a dynamically determined size. The AE settings system 106 uses the dynamic ROI 104 applied to the second video frame 118 to compute AE settings 108, which are applied to configure the camera 110.

Figure 2:
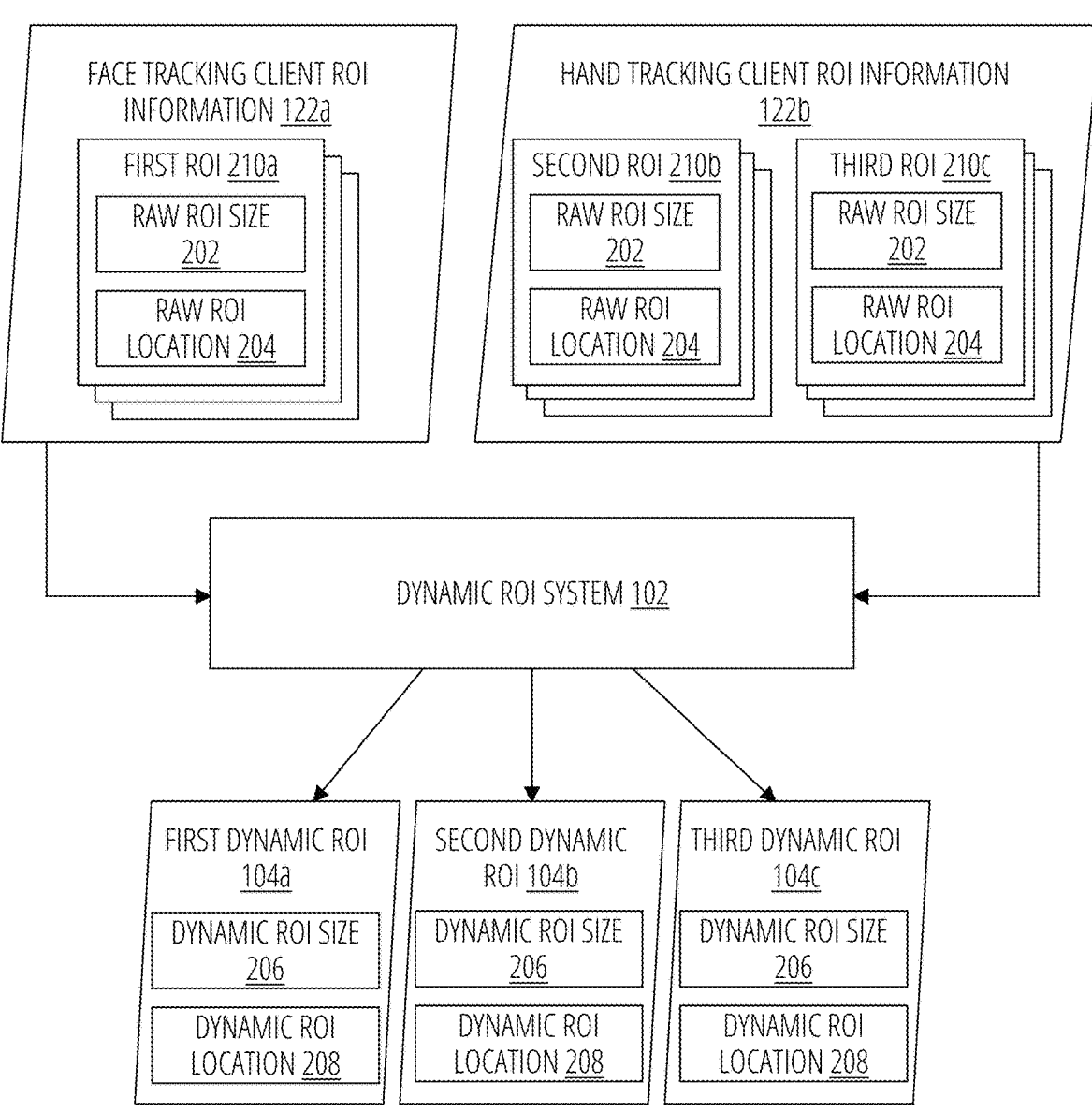
FIG. 2 is a block diagram of client ROI information inputs and dynamic ROI outputs of an example dynamic ROI system of the AE system of FIG. 1, according to some examples.
Figure 3:
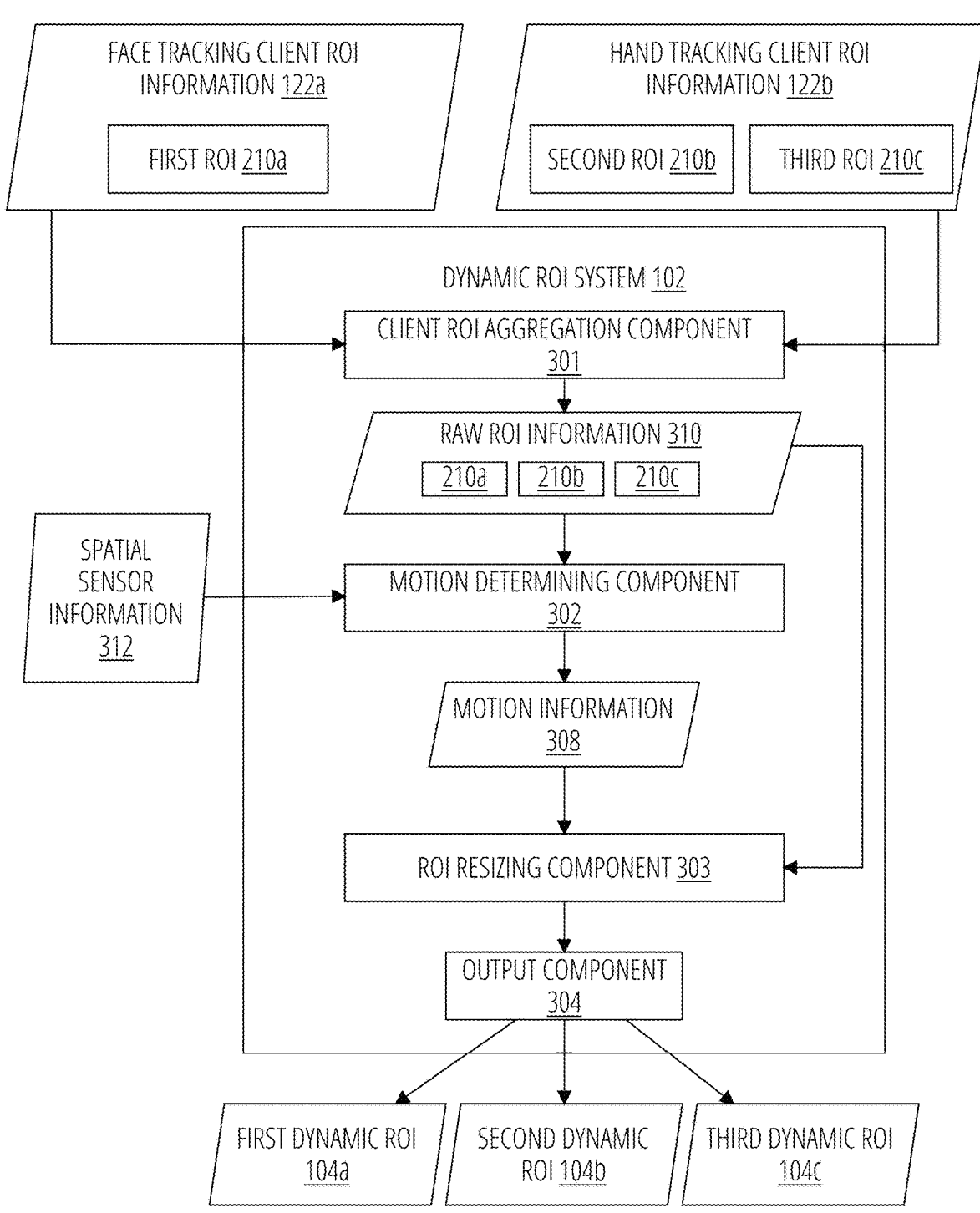
FIG. 3 is a block diagram of an example dynamic ROI system of the AE system of FIG. 1, according to some examples.

Further details of the operations of the example AE system 100 and examples of its two subsystems are described below: details of the operation of an example dynamic ROI system 102 are shown in FIG. 2 and FIG. 3, details of the operation of an example AE settings system 106 are described with reference to FIG. 7A, and an example method 400 performed by the AE system 100 as a whole is illustrated in the flowchart of FIG. 4.

FIG. 2 is a block diagram of an example dynamic ROI system 102 of the AE system 100, showing details of the client ROI information inputs and dynamic ROI outputs thereof. Two examples of client ROI information 122 are shown in FIG. 2: face tracking client ROI information 122a and hand tracking client ROI information 122b.

The face tracking client ROI information 122a may correspond to client ROI information 122 generated by a face tracking client configured to process image data (e.g., the previous video frame(s) 112 and first video frame 114) to track faces visible within the image data. The face tracking client may generate its face tracking client ROI information 122a as a first ROI 210a specified by at least a raw ROI size 202 and a raw ROI location 204. For example, the first ROI 210a may be a bounding box generated by the face tracking client around the location of a specific face visible in one or more of the images (e.g., previous video frame(s) 112 and first video frame 114). The bounding box may be specified by a raw ROI size 202, such as pixel dimensions of the bounding box (e.g., 320 horizontal pixels by 610 vertical pixels) in each of the video frames 112 and 114 in which the face is visible within the FOV of the camera 110. The bounding box may also be specified by a raw ROI location 204, such as pixel coordinates of a corner or other reference point of the bounding box (e.g., upper left corner at [x,y] pixel coordinates [80,730]) in each of the video frames 112 and 114 in which the face is visible within the FOV of the camera 110.

Similarly, the hand tracking client ROI information 122b may correspond to client ROI information 122 generated by a hand tracking client configured to process image data (e.g., the previous video frame(s) 112 and first video frame 114) to track hands visible within the image data. The hand tracking client may generate its hand tracking client ROI information 122b as a second ROI 210b and third ROI 210c, each specified by at least a raw ROI size 202 and a raw ROI location 204. The raw ROI size 202 and raw ROI location 204 of the second ROI 210b may indicate the size and location, respectively, of the bounding boxes around a first hand visible in each of one or more of the first plurality of video frames; the raw ROI size 202 and raw ROI location

204 of the third ROI 210*c* may indicate the size and location, respectively, of the bounding boxes around a second hand visible in each of one or more of the first plurality of video frames.

If a given raw ROI (e.g., 210*a*, 210*b*, or 210*c*) is visible in at least two of the video frames of the first plurality of video frames, then the changes in the raw ROI size 202 and/or raw ROI location 204 from an earlier video frame to a later video frame of the first plurality of video frames may be used to estimate motion of the ROI, as described in greater detail below with reference to the motion determination operation of FIG. 5. The example raw ROIs 210*a*, 210*b*, and 210*c* shown in FIG. 2 are visible in each of a plurality of video frames, and a video frame may have its own raw ROI size 202 and raw ROI location 204 for a given raw ROI.

The face tracking client and/or the hand tracking client may be software clients executed by the camera system or a device coupled to or incorporating the camera system. The face tracking client and/or the hand tracking client may be configured to track faces or hands, respectively, within the FOVs of the camera 110. The client ROI information 122 may therefore, in some examples, include one or more ROIs configured to track and properly expose a face or a hand within a video frame, such as a bounding box around the region occupied by the face or hand within the image. In some examples, the face tracking client and/or the hand tracking client may be configured to track more than one face or hand, respectively.

The dynamic ROI system 102 processes the client ROI information 122 (e.g., face tracking client ROI information 122*a* and hand tracking client ROI information 122*b*). An example of such processing is described below with reference to FIG. 3 through FIG. 5. As a result of such processing, the dynamic ROI system 102 generates one or more dynamic ROIs based on the raw ROIs specified by the client ROI information 122.

In FIG. 2, the dynamic ROIs are shown as first dynamic ROI 104*a*, second dynamic ROI 104*b*, and third dynamic ROI 104*c*, corresponding to first ROI 210*a*, second ROI 210*b*, and third ROI 210*c*, respectively. Each dynamic ROI 104*a*, 104*b*, and 104*c* has a respective dynamic ROI size 206 and dynamic ROI location 208. The dynamic ROI size 206 and dynamic ROI location 208 may be generated based on the corresponding raw ROI size 202 and raw ROI location 204, respectively, of the corresponding raw ROI in one or more of the video frames of the first plurality of video frames. In some examples, the dynamic ROI size 206 and dynamic ROI location 208 are computed based on the raw ROI size 202 and raw ROI location 204 of the corresponding raw ROI in the first video frame.

The dynamic ROI size 206 may be computed by enlarging the corresponding raw ROI size 202 based on a degree of motion detected for the corresponding raw ROI and/or for the camera 110 relative to the corresponding raw ROI. The dynamic ROI location 208 may be computed by placing the dynamic ROI to overlap with the corresponding raw ROI. In some examples, the dynamic ROI location 208 may be computed to center the dynamic ROI 104 on the same location as the raw ROI. In some examples, the dynamic ROI location 208 may be computed to overlap the dynamic ROI 104 with the raw ROI, but to offset the center of the dynamic ROI 104 from the center of the raw ROI based on detected motion. Further details of dynamic ROI generation are described below with reference to FIG. 3 through FIG. 5.

FIG. 3 is a block diagram showing further details of the operation of an example dynamic ROI system 102.

The example dynamic ROI system 102 shown in FIG. 3 includes four subsystems or components: a client ROI aggregation component 301, a motion determining component 302, a ROI resizing component 303, and an output component 304. In some examples, some or all of the functions of one or more of these components may be implemented by one or more of the other components, or by another component or components of the AE system 100, the camera system, or a device or system incorporating the camera system.

The client ROI aggregation component 301 is configured to receive client ROI information 122 from the one or more clients, aggregate the client ROI information 122 from multiple clients into a single collection of ROIs, and to convey the single collection of ROIs to the motion determining component 302 and the ROI resizing component 303. In some examples, the client ROI aggregation component 301 generates and conveys the single collection of ROIs as a single array or vector of all client ROIs (e.g., raw ROIs) received from all clients.

Thus, in the illustrated example, the client ROI aggregation component 301 processes the face tracking client ROI information 122*a* and hand tracking client ROI information 122*b* to aggregate the client ROIs from each client into a single vector. The first ROI 210*a* from the face tracking client ROI information 122*a* is aggregated together with the second ROI 210*b* and third ROI 210*c* from the hand tracking client ROI information 122*b* into a single vector, e.g., a concatenation of ROIs 210*a*, 210*b*, and 210*c*. The single collection of all raw ROIs received from clients and aggregated together is shown as the raw ROI information 310, which is conveyed to the motion determining component 302 and ROI resizing component 303.

The motion determining component 302 is configured to process the raw ROI information 310 and/or spatial sensor information 312 to generate motion information 308.

In some examples, the motion determining component 302 receives spatial sensor information 312 representative of motion of the camera. For example, the spatial sensor information 312 may be received from one or more spatial sensors, such as an IMU, configured to rotate and translate with the camera 110. The IMU or other spatial sensor may generate spatial sensor information 312 at the hardware level, including rotation information and translation information. Other spatial sensors may generate other spatial sensor information 312; some examples of spatial sensors are described below with reference to motion components 930 and position components 934 of the machine 900 of FIG. 9. The motion determining component 302 is configured to process the spatial sensor information 312 to generate camera motion information, which is processed in turn to generate the motion information 308. For example, rotation information and translation information of an IMU coupled to the camera 110 may be processed as motion vectors that allow the motion determining component 302 to determine a degree of movement of a given raw ROI within the FOV of the camera.

In some examples, the motion determining component 302 processes the raw ROI size 202 and/or raw ROI location 204 of each raw ROI in the raw ROI information 310 over multiple video frames to determine motion of the ROI within the FOV of the camera 110. For example, a center, corner, or other reference point of an ROI may be tracked from one video frame to a subsequent video frame, or over more than two frames, to determine one or more motion vectors of the ROI over time. The magnitude of these motion vectors may be used to determine a degree of motion of the raw ROI. Thus, the raw ROI information 310 may identify a given raw ROI within the first plurality of video frames captured by the camera, including the first video frame 114 (e.g., previous video frame(s) 112 and first video frame 114), and the motion information 308 may be generated by the motion determining component 302 by processing the raw ROI information 310 to generate ROI motion information representative of motion of the raw ROI within the FOV of the camera in the first plurality of video frames, and processing the ROI motion information to generate the motion information.

In some examples, both camera motion information (derived from the spatial sensor information 312 generated by the spatial sensor information 312) and ROI motion information (determined based on the changes in raw ROI location 204 and/or raw ROI size 202 over multiple video frames) can be used by the motion determining component 302 to compute the motion information 308 for a given raw ROI.

In some examples, the spatial sensor information 312 may be down-sampled or otherwise rescaled in time to synchronize with the time series of images captured by the camera 110, because the spatial sensors (e.g., an IMU) may generate spatial sensor information 312 at a much faster sampling rate than the frame rate of the camera 110.

Thus, for each raw ROI in the raw ROI information 310 (e.g., first ROI 210a, second ROI 210b, and third ROI 210c), the motion determining component 302 generates motion information intended to represent motion of the raw ROI relative to the FOV of the camera 110. In some examples, the motion information 308 includes a motion magnitude value for each raw ROI: for example, the motion magnitude value may be computed as the absolute value of a sum, or of a weighted sum, of all motion vectors from camera motion and/or ROI motion between frames. In some examples, the motion information 308 includes a direction of motion of the raw ROI: for example, the direction of motion of a raw ROI may be computed as a sum, or a weighted sum, of all motion vectors from camera motion and/or ROI motion between frames.

After the motion information 308 has been generated, the ROI resizing component 303 processes the raw ROI information 310 and the motion information 308 to generate, for each raw ROI in the raw ROI information 310, a respective dynamic ROI 104 (e.g., first dynamic ROI 104a, second dynamic ROI 104b, and third dynamic ROI 104c as shown in FIG. 3). The ROI resizing component 303 may use the motion information 308 for each raw ROI as a measure of the likely movement of the raw ROI between the first video frame 114 and the second video frame 118, and enlarge the raw ROI size 202 accordingly to improve the chance that the object of interest within the raw ROI in the first video frame 114 will be captured within the dynamic ROI 104 in the second video frame 118. Thus, the ROI resizing component 303 may generate a dynamic ROI size 206 for a given dynamic ROI 104 that expands the raw ROI size 202 of the corresponding raw ROI sufficiently to capture any anticipated degree of movement of the object of interest relative to the FOV of the camera 110 between first video frame 114 and second video frame 118.

In some examples, the ROI resizing component 303 determines a degree of movement of the raw ROI between first video frame 114 and second video frame 118 by extrapolating the degree of movement of the raw ROI in the motion information 308 (e.g., the motion magnitude value)

across the time period between the capture of first video frame 114 and the capture of second video frame 118. This degree of movement is then used to determine the width of a border added around the raw ROI to expand the dynamic ROI 104 from the raw ROI size 202 to the dynamic ROI size 206. In some examples, the full degree of movement may not be added as a border width around the perimeter of the raw ROI; instead, only a portion of the degree of movement may be added, such as 50% of 75% of the degree of movement.

In some examples, the direction of motion of the raw ROI as represented in the motion information 308 may be used to generate the dynamic ROI location 208. For example, instead of expanding the raw ROI size 202 by the full degree of motion of the raw ROI around the entire perimeter of the raw ROI, the raw ROI may only be expanded in the direction of motion. Thus, for example, if the raw ROI is determined to be moving upward with a degree of motion of 20 pixels, the raw ROI size 202 may be expanded upward by 20 pixels to generate the dynamic ROI size 206 and dynamic ROI location 208. In some examples, the raw ROI is expanded to some degree within a fixed angle of the direction of motion, or within an angle determined by a degree of variation in the direction of motion. For example, the raw ROI may be expanded by 20 pixels in each direction within 45 degrees of the direction of motion. In the case of a bounding box defining an ROI, the raw ROI may be expended on only one side or on two adjacent sides depending on the angle of the direction of motion. Further examples of expanding the raw ROI size 202 to generate the dynamic ROI size 206 are described below with reference to FIG. 7A through FIG. 8B.

After the ROI resizing component 303 generates the dynamic ROIs 104a, 104b, and 104c, the output component 304 conveys the dynamic ROIs 104a, 104b, and 104c to the AE settings system 106 for generation of AE settings for the camera 110 based on the dynamic ROIs 104a, 104b, and 104c applied to the second video frame 118.

FIG. 4 shows operations of an example method 400 for dynamically sizing ROIs used for AE. The method 400 provides an example of how the AE system 100 can resize an ROI (e.g., generate dynamic ROI 104 based on a raw ROI), and apply the resized ROI to a video frame (e.g., second video frame 118), to compute AE settings 108 for a camera 110.

Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence. Although the operations of the method 400 are described as being performed by a processor implementing the example AE system 100, it will be appreciated that one or more of the operations may be performed by another device or system, such as another component or multiple other components of the multi-camera system. Specifically, method 400 is described primarily with reference to the operations of the ROI resizing component 303 and AE settings system 106; the operations of an example client ROI aggregation component 301 are described above with reference to FIG. 3, and should be understood to be performed prior to the operations of method 400.

In some examples, method 400 is performed continuously during multi-camera operation of the multi-camera system.

The method 400 is performed at each time step of a sequence of time steps, such as every time a new video frame is captured by the cameras. Thus, in some examples, the method 400 is iterated at the frame rate of the cameras of the camera system, such as 30 frames per second (30 Hz) or 60 frames per second (60 Hz). In some examples, the AE system 100 does not perform the method 400 for each frame, but instead after every n frames, such as every 2 or 3 frames (e.g., at a rate of 15 Hz or 10 Hz for a 30 frames per second (fps) system). It will be appreciated that the duration and frequency of time steps for performing method 400 may follow different rules in different examples, and the duration or frequency of time steps may be adjustable or otherwise variable in some examples (e.g., the frequency with which method 400 is performed may vary in different operating modes and/or according to user-determined settings).

The example method 400 will now be described with references to the operations and decisions shown in the flowchart of FIG. 4.

At operation 402, the motion determining component 302 and ROI resizing component 303 obtain raw ROI information 310 identifying a raw ROI (e.g., first ROI 210*a*), having a raw ROI size 202, within a first video frame 114 captured by a camera 110. The motion determining component 302 processes the raw ROI information 310, potentially in combination with the spatial sensor information 312, to generate the motion information 308 representative of motion of the raw ROI (e.g., 210*a*) relative to a FOV of the camera 110 (based on camera motion information and/or ROI motion information), as described above.

At operation 404, the ROI resizing component 303 obtains the motion information 308 from the motion determining component 302.

At operation 406, the ROI resizing component 303 processes the raw ROI information 310 and the motion information 308 to generate a dynamic ROI 104 (e.g., first dynamic ROI 104*a*) having a dynamic ROI size 206 larger than the raw ROI size 202. In some examples, as described above, a dynamic ROI location 208 may also be generated based on the raw ROI location 204, as described above.

At operation 408, the camera 110 captures a second video frame 118.

At operation 410, the AE settings system 106 processes a portion of the second video frame 118 defined by the dynamic ROI 104 to generate AE settings 108 for the camera 110.

Following the performance of method 400, the AE settings 108 are used by the camera system to adjust the exposure of the camera 110.

It will be appreciated, based on the multi-ROI examples described above with reference to FIG. 2 and FIG. 3, that method 400 may be performed with multiple raw ROIs as inputs and generating multiple dynamic ROIs as outputs for generating the AE settings. The raw ROI information 310 may thus further identify one or more additional raw ROIs, each having a respective raw ROI size 202. The motion information 308 may be further representative of motion of the one or more additional raw ROIs relative to the FOV of the camera 110. The raw ROI information 310 and the motion information 308 may be further processed to generate, for each of the one or more additional raw ROIs, a respective additional dynamic ROI 104 (e.g., second dynamic ROI 104*b* and third dynamic ROI 104*c*), and the AE settings 108 may be further generated by processing a respective portion of the second video frame 118 defined by each respective dynamic ROI (e.g., 104*b* and 104*c*).

In some examples, as described above, the raw ROI is generated by a client, and the raw ROI is located at a location of an object tracked by the client (e.g., a face or hand) in the first video frame 114. The dynamic ROI size 206 may be enlarged relative to the raw ROI size 202 based at least partly on a degree of motion of the object as represented by the motion information 308. At operation 410, the portion of the second video frame 118 defined by the dynamic ROI 104 may include portions of the second video frame 118 at the location of the object, as defined by the dynamic ROI 104. The AE settings 108 may be configured to avoid underexposure or overexposure of the object in further video frames captured by the camera 110.

An example of the motion information generation operation 404, as performed by motion determining component 302, is shown in the flowchart of FIG. 5.

At operation 502, the motion determining component 302 obtains spatial sensor information 312. In some examples, operation 502 includes operation 503, in which rotation information and translation information are obtained. The rotation information and translation information are generated by an IMU configured to rotate and translate with the camera 110.

At operation 504, the motion determining component 302 processes the spatial sensor information 312 to generate camera motion information representative of motion of the camera 110.

At operation 506, the motion determining component 302 processes video frames captured by the camera (e.g., previous video frame(s) 112 and first video frame 114) to generate ROI motion information representative of motion of the raw ROI.

At operation 508, the motion determining component 302 processes the camera motion information and the ROI motion information to generate the motion information 308.

Figure 6:
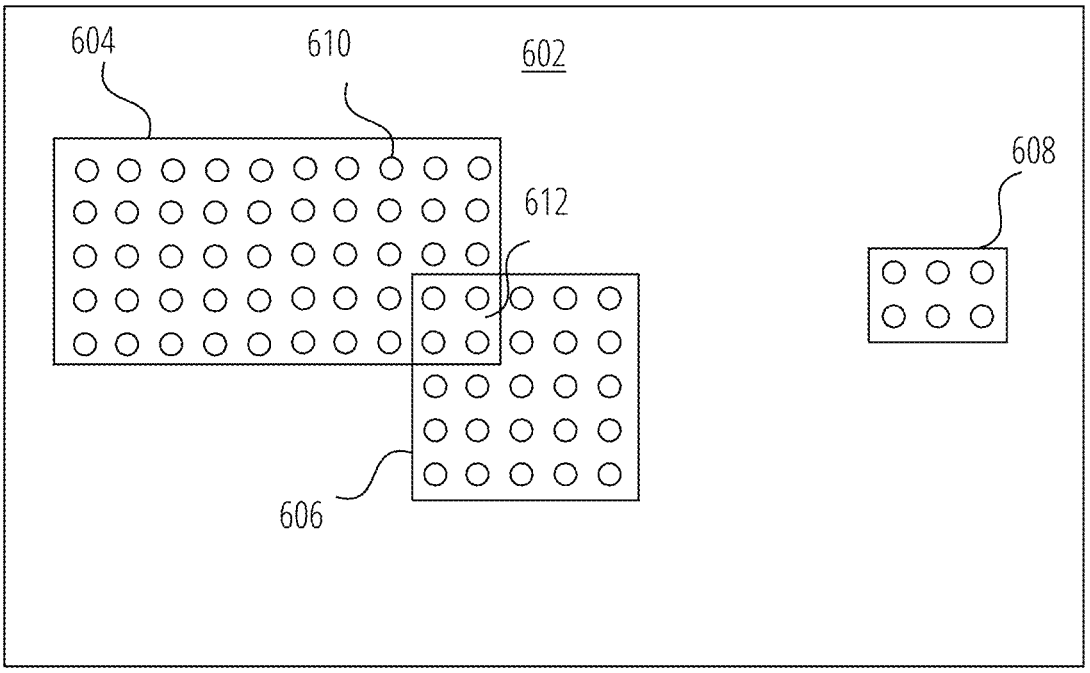
FIG. 6 illustrates an example image showing multiple ROIs being sampled for computing AE settings, according to some examples.

FIG. 6 shows an example image 602 provided as input to the AE settings system 106 for generating AE settings 108. In the illustrated example, the brightness of the input image 602 captured by the camera 110 is metered or otherwise measured within the ROIs associated with the image 602, optionally weighted on a per-ROI and/or per-pixel (or per-sampling location) basis. A sum, weighted sum, average, or weighted average of brightness samples is then used as an overall brightness level for generating the AE settings 108.

In the illustrated example, the image 602 (e.g., second video frame 118) is associated with three ROIs: a first ROI 604 (e.g., first dynamic ROI 104*a*), a second ROI 606 (e.g., second dynamic ROI 104*b*), and a third ROI 608 (e.g., third dynamic ROI 104*c*). The locations (e.g., pixel coordinates of each corner) of the ROIs 604, 606, and 608 within the image 602 may be determined by the dynamic ROI location 208 of each ROI. The dimensions of each ROI (e.g., horizontal and vertical pixel dimensions) may be determined by the dynamic ROI size 206 of each ROI.

Locations within each ROI are sampled for brightness, such as a luma or luminance value, by the AE settings system 106. The sampled locations (shown as pixel locations 610 in FIG. 6) may correspond to pixel locations of the image 602, regions of the image 602, or some other specification for locations within the image 602, and may be referred to as "pixel locations" or "sample locations". In some examples, the ROIs are sampled over a region or multiple pixels, or at a sampling period of some number of pixels (m>1) in the horizontal and/or vertical dimensions (where the length of the period can differ in the two dimensions). It will be appreciated that various techniques can be used for brightness sampling of regions of an image.

In some examples, the sampling period is relatively high in order to simplify computation of the AE settings. For example, a 1280 by 1024 pixel image 602 may be sampled at pixel locations 610 separated at a period of 20 pixels in the horizontal dimension and 21.333 pixels in the vertical direction, resulting in 64 by 48=3072 potential pixel locations 610 to be sampled within the image 602.

In some examples, each ROI, and/or different locations within each ROI, may be associated with different weights, as represented by ROI weight information which may be encoded within the raw ROI information 310 and/or the dynamic ROIs 104 in some examples. In some examples, the pixel locations 610 sampled within first ROI 604 may be weighted by a first weight value, and the pixel locations 610 sampled within second ROI 606 may be weighted by a second weight value, wherein the first weight value and second weight value are derived from the ROI weight information of the raw ROI information 310 and/or one or more of the ROIs encoded therein (e.g., first ROI 210a and second ROI 210b, respectively).

In some examples, one or more of the ROIs may be associated with ROI weight information indicating a varying weight to be applied to different pixel locations 610 within the ROI. Thus, for example, a raw ROI size (e.g., first ROI 210a), as encoded in the raw ROI information 310, may include ROI weight information that assigns a higher weight value to pixel locations 610 at the center of the ROI (e.g., first ROI 604) than pixel locations 610 at the periphery of the ROI. This ROI weight information may, in some examples, be propagated to an encoding of the corresponding dynamic ROI 104 (e.g., first dynamic ROI 104a), such that the encoding of the dynamic ROI includes the ROI weight information of the corresponding raw ROI. It will be appreciated that other weighting schemes can be encoded in the ROI weight information in different examples.

In an example computational operation of the AE settings system 106 on image 602, each sampled pixel location 610 within the first ROI 604, second ROI 606, or third ROI 608 is metered, and its measured brightness value is multiplied by or otherwise combined with its associated weight value as represented in the ROI weight information for the ROI. These weighted sample values are then averaged or otherwise combined (e.g., as an arithmetic or geometric mean, a median, or some other averaging function) to generate an overall brightness value. The overall brightness value is used to generate the AE settings 108 for the camera 110.

In some examples, the sampled brightness values of each pixel location 610, weighted or unweighted, may be used to generate a brightness histogram, and the brightness histogram is used to generate the AE settings 108. In some such examples, the weight value (e.g., a weight value from 0.0 to 1.0) is used to weight the contribution of a given sample's brightness value to the effective number of samples counted at the measured brightness value within the histogram.

One consequence of this sampling and weighted averaging operation is that any region where two ROIs overlap, such as overlapping region 612, will be sampled twice and weighted according to the ROI weight information of both ROIs (e.g., first ROI 604 and second ROI 606). Thus, in the example of weight values between 0.0 and 1.0, the pixel locations 610 in the overlapping region 612 may have an effective weight value of the weight value assigned by first ROI 604 plus the weight value assigned by second ROI 606 in generating the histogram or weighted average.

The AE settings 108 generated by the AE settings system 106 may include an exposure time, a gain value, and/or other exposure settings.

In some examples, using a sampling and averaging (or weighted averaging) operation to generate the overall brightness value is computationally lightweight and simple, thereby potentially enabling low-overhead computation of AE settings at a high camera frame rate.

Figure 7A:
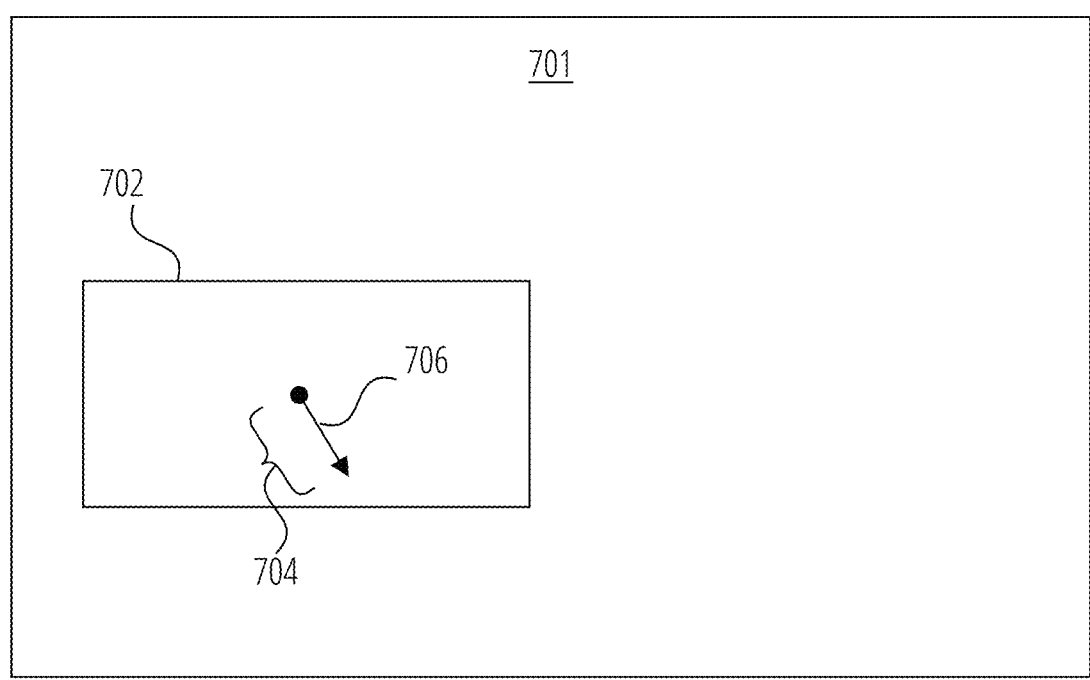
FIG. 7A illustrates an example image showing a raw ROI and an associated motion vector, according to some examples.

FIG. 7A shows an example image 701 having a raw ROI 702 defined in relation thereto. In some examples, the image 701 may be first video frame 114, and the raw ROI 702 may correspond to a client ROI, such as a hand tracking client ROI representing a bounding box around a hand visible in first video frame 114.

A motion vector 706 for the raw ROI 702 is shown. It will be appreciated that the motion vector 706 is not necessarily visible in the image 701; rather, it is shown superimposed on the raw ROI 702 in FIG. 7A for illustrative purposes. In some embodiments, the motion vector 706 represents motion information 308, which may be generated by the motion determining component 302 based on some combination of ROI motion information (derived from the previous video frame(s) 112 and first video frame 114) and camera motion information (derived from the spatial sensor information 312). The motion vector 706 has a direction of motion (e.g., downward and somewhat to the right) and a motion magnitude value 704, indicating an overall direction and magnitude of motion of the raw ROI 702 relative to the FOV of the camera 110.

Figure 7B:
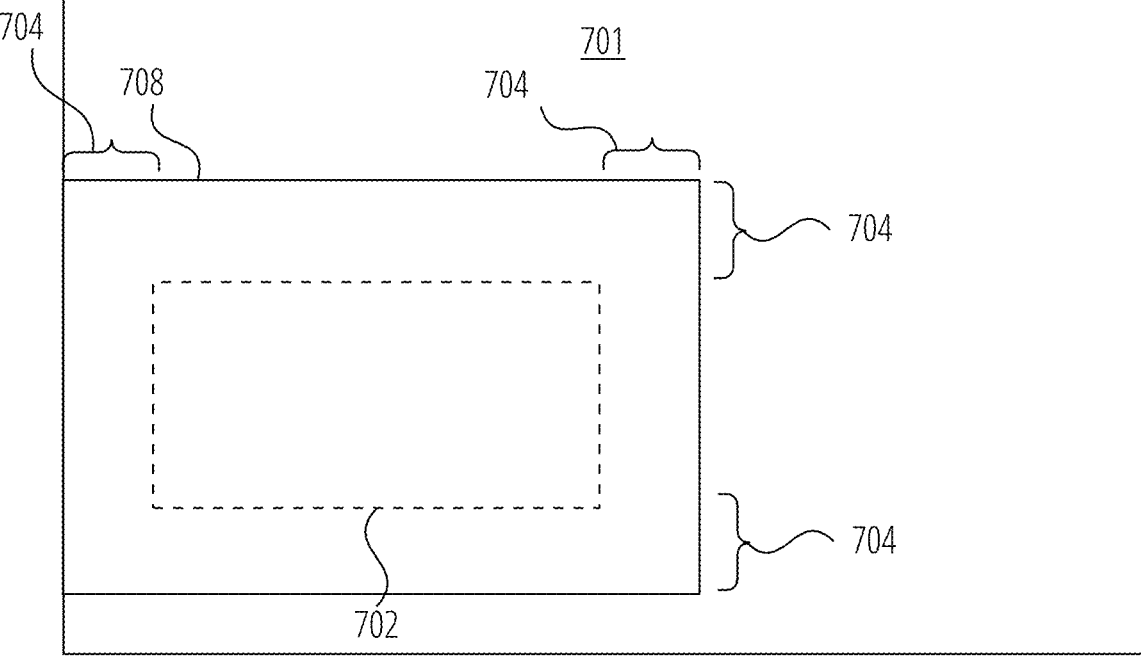
FIG. 7B illustrates an example image showing a first example dynamic ROI generated based on the raw ROI of FIG. 7A, according to some examples.

FIG. 7B shows the image 701 of FIG. 7A in association with a first example dynamic ROI 708 generated based on the raw ROI 702 and the motion vector 706. In this example, the dynamic ROI 708 is resized by the ROI resizing component 303 by adding a border around the perimeter of the raw ROI 702. The width of the border corresponds to motion magnitude value 704.

The approach to dynamic resizing of ROIs shown in FIG. 7B may be effective to account for objects of interest in motion relative to the camera where the direction of movement is erratic or unpredictable, but the degree of motion is likely to persist.

Figure 8A:
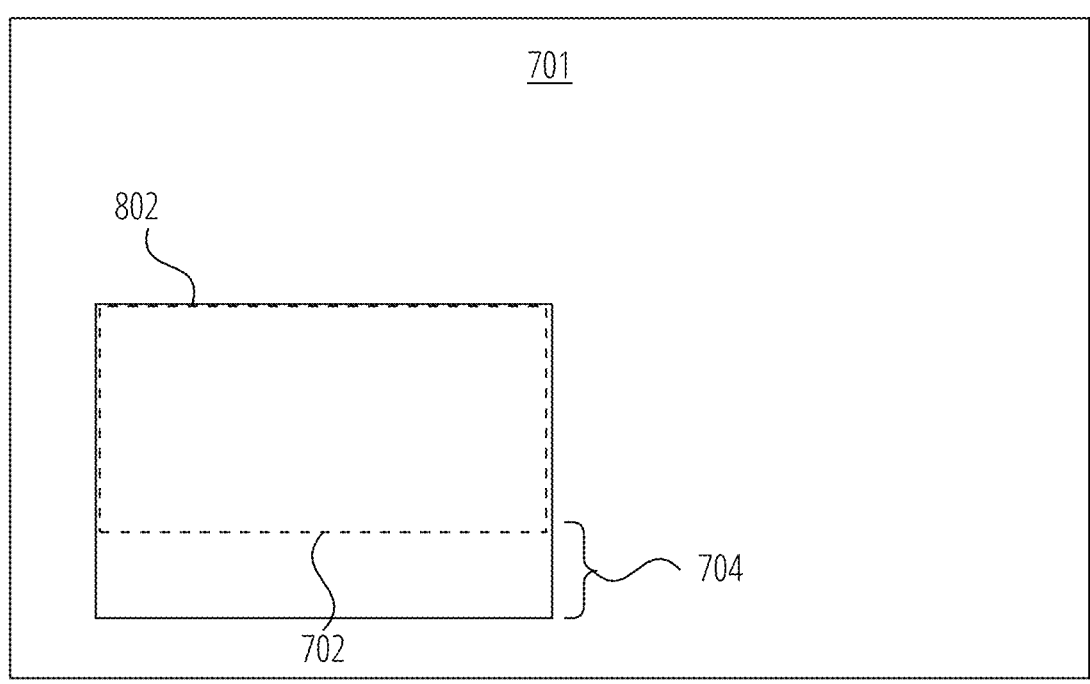
FIG. 8A illustrates an example image showing a second example dynamic ROI generated based on the raw ROI of FIG. 7A, according to some examples.

FIG. 8A shows the image 701 of FIG. 7A in association with a second example dynamic ROI 802 generated based on the raw ROI 702 and the motion vector 706. In this example, the dynamic ROI 708 is resized by the ROI resizing component 303 by adding a border only on one side of the raw ROI 702. The side of the raw ROI 702 selected for addition of the border is the bottom side closest to the direction of motion of the motion vector 706. The width of the border corresponds to motion magnitude value 704.

The approach to dynamic resizing of ROIs shown in FIG. 8A may be effective to account for objects of interest in motion relative to the camera where the direction of movement is likely to persist and is relatively orthogonal to one of the sides of the raw ROI 702.

Figure 8B:
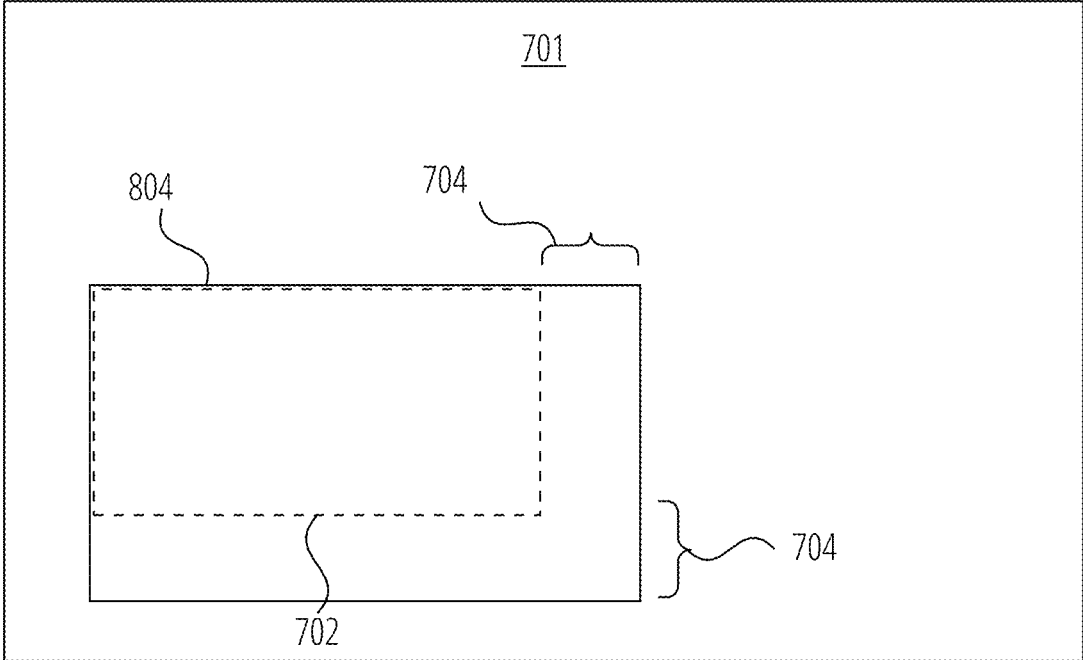
FIG. 8B illustrates an example image showing a third example dynamic ROI generated based on the raw ROI of FIG. 7A, according to some examples.

FIG. 8B shows the image 701 of FIG. 7A in association with a third example dynamic ROI 804 generated based on the raw ROI 702 and the motion vector 706. In this example, the dynamic ROI 708 is resized by the ROI resizing component 303 by adding a border on two sides of the raw ROI 702. The sides of the raw ROI 702 selected for addition of the border are the bottom side and the right side, closest to the direction of motion of the motion vector 706. The width of the border corresponds to motion magnitude value 704.

The approach to dynamic resizing of ROIs shown in FIG. 8A may be effective to account for objects of interest in motion relative to the camera where the direction of movement is likely to persist but is not orthogonal to one of the sides of the raw ROI 702.

It will be appreciated that, in resizing the raw ROI 702 from its original raw ROI size 202 to a new dynamic ROI size 206 of dynamic ROI 708, dynamic ROI 802, or dynamic ROI 804, it may also be necessary to redefine the raw ROI location 204 to a new dynamic ROI location 208, depending on how the raw ROI location 204 is defined. For example, if the raw ROI location 204 is defined in reference to the upper left corner of the raw ROI 702, then the dynamic ROI location 208 of dynamic ROI 708 will be shifted up and to the left, but the dynamic ROI location 208 of dynamic ROI 802 and dynamic ROI 804 will be the same as the raw ROI location 204. In a further example, if the raw ROI location 204 is defined in reference to a center point of the raw ROI 702, then all three dynamic ROIs 708, 802, and 804 will have an updated dynamic ROI location 208 relative to the raw ROI location 204.

Machine Architecture

Figure 9:
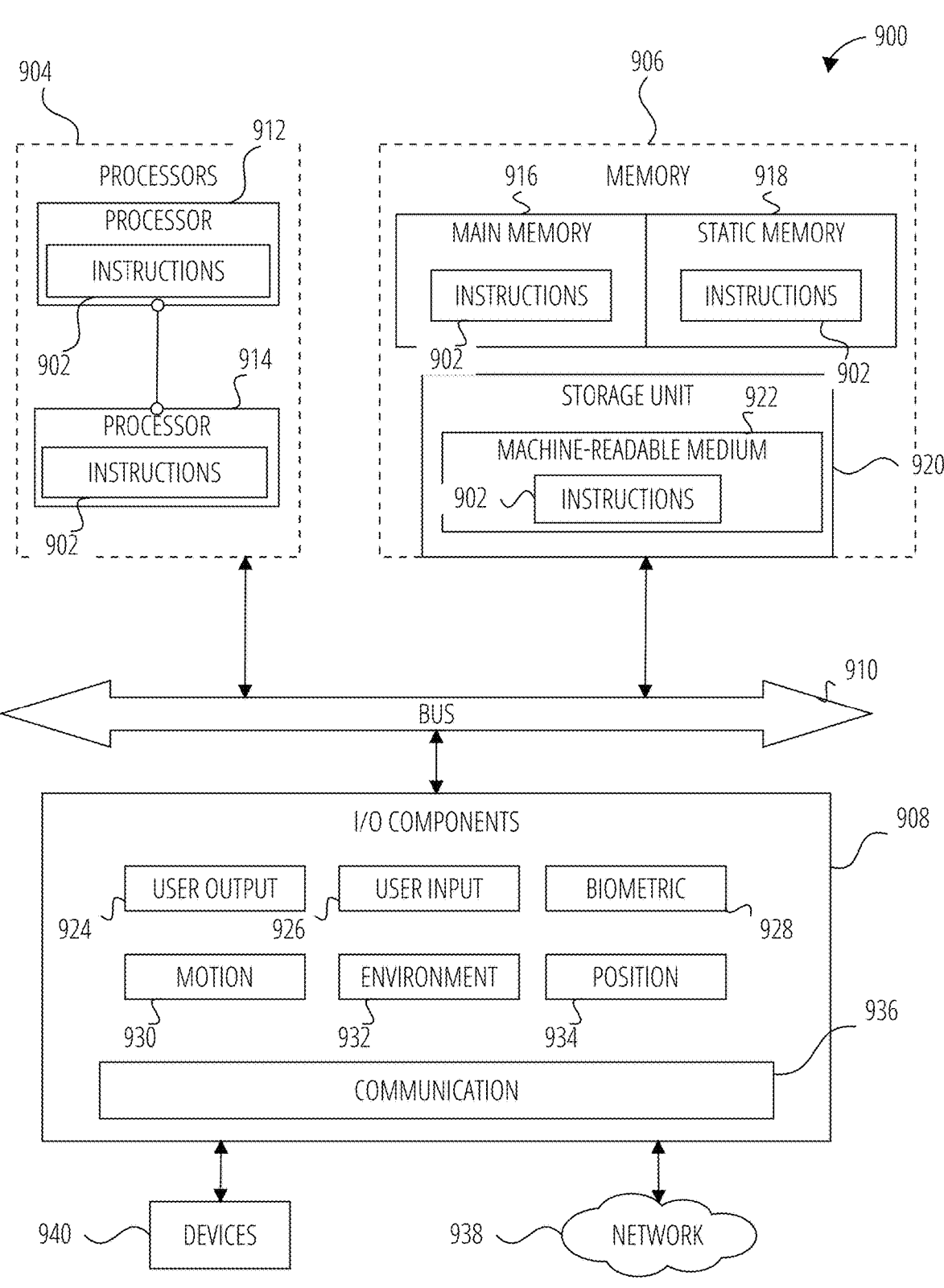
FIG. 9 is a diagrammatic representation of a machine in the form of a computer system within which a set of instructions may be executed to cause the machine to perform any one or more of the methodologies discussed herein, according to some examples.

FIG. 9 is a diagrammatic representation of the machine 900 within which instructions 902 (e.g., software, a program, an application, an applet, an app, or other executable code) for causing the machine 900 to perform any one or more of the methodologies discussed herein may be executed. For example, the instructions 902 may cause the machine 900 to execute any one or more of the methods described herein. The instructions 902 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while a single machine 900 is illustrated, the term "machine" shall also be taken to include a collection of machines that individually or jointly execute the instructions 902 to perform any one or more of the methodologies discussed herein. In some examples, the machine 900 may comprise both client and server systems, with certain operations of a particular method or algorithm being performed on the server-side and with certain operations of the particular method or algorithm being performed on the client-side.

The machine 900 may include processors 904, memory 906, and input/output I/O components 908, which may be configured to communicate with each other via a bus 910. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that execute the instructions 902. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 916, a static memory 918, and a storage unit 920, both accessible to the processors 904 via the bus 910. The main memory 916, the static memory 918, and storage unit 920 store the instructions 902 embodying any one or more of the methodologies or functions described herein. The instructions 902 may also reside, completely or partially, within the main memory 916, within the static memory 918, within machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones may include a touch input device or other such input mechanisms, while a headless server machine will likely not include such a touch input device. It will be appreciated that the I/O components 908 may include many other components that are not shown in FIG. 9. In various examples, the I/O components 908 may include user output components 924 and user input components 926. The user output components 924 may include visual components (e.g., a display, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 908 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, and/or rotation sensor components (e.g., gyroscope).

The environmental components 932 include, for example, one or more cameras (with still image/photograph and video capabilities) such as camera 110, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth sensors (such as one or more LIDAR arrays), or other components that may provide indications, measurements, or signals corresponding to a surrounding physical environment.

With respect to cameras, the machine 900 may have a camera system comprising, for example, front cameras on a front surface of the machine 900 and rear cameras on a rear surface of the machine 900. The front cameras may, for example, be used to capture still images and video of a user of the machine 900 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the machine 900 may also include a 360° camera for capturing 360° photographs and videos.

Further, the camera system of the machine 900 may include dual rear cameras (e.g., a primary camera as well as a depth-sensing camera), or even triple, quad or penta rear camera configurations on the front and rear sides of the machine 900. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

In some examples, the spatial sensor information 312 of the camera system may be implemented using one or more of the motion components 930 and/or position components 934.

Communication may be implemented using a wide variety of technologies. The I/O components 908 further include communication components 936 operable to couple the machine 900 to a network 938 or devices 940 via respective coupling or connections. For example, the communication components 936 may include a network interface component or another suitable device to interface with the network 938. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 916, static memory 918, and memory of the processors 904) and storage unit 920 may store one or more sets of instructions and data structures (e.g., software) embodying or used by any one or more of the methodologies or functions described herein. These instructions (e.g., the instructions 902), when executed by processors 904, cause various operations to implement the disclosed examples.

The instructions 902 may be transmitted or received over the network 938, using a transmission medium, via a network interface device (e.g., a network interface component included in the communication components 936) and using any one of several well-known transfer protocols (e.g., hypertext transfer protocol [HTTP]). Similarly, the instructions 902 may be transmitted or received using a transmission medium via a coupling (e.g., a peer-to-peer coupling) to the devices 940.

Software Architecture

Figure 10:
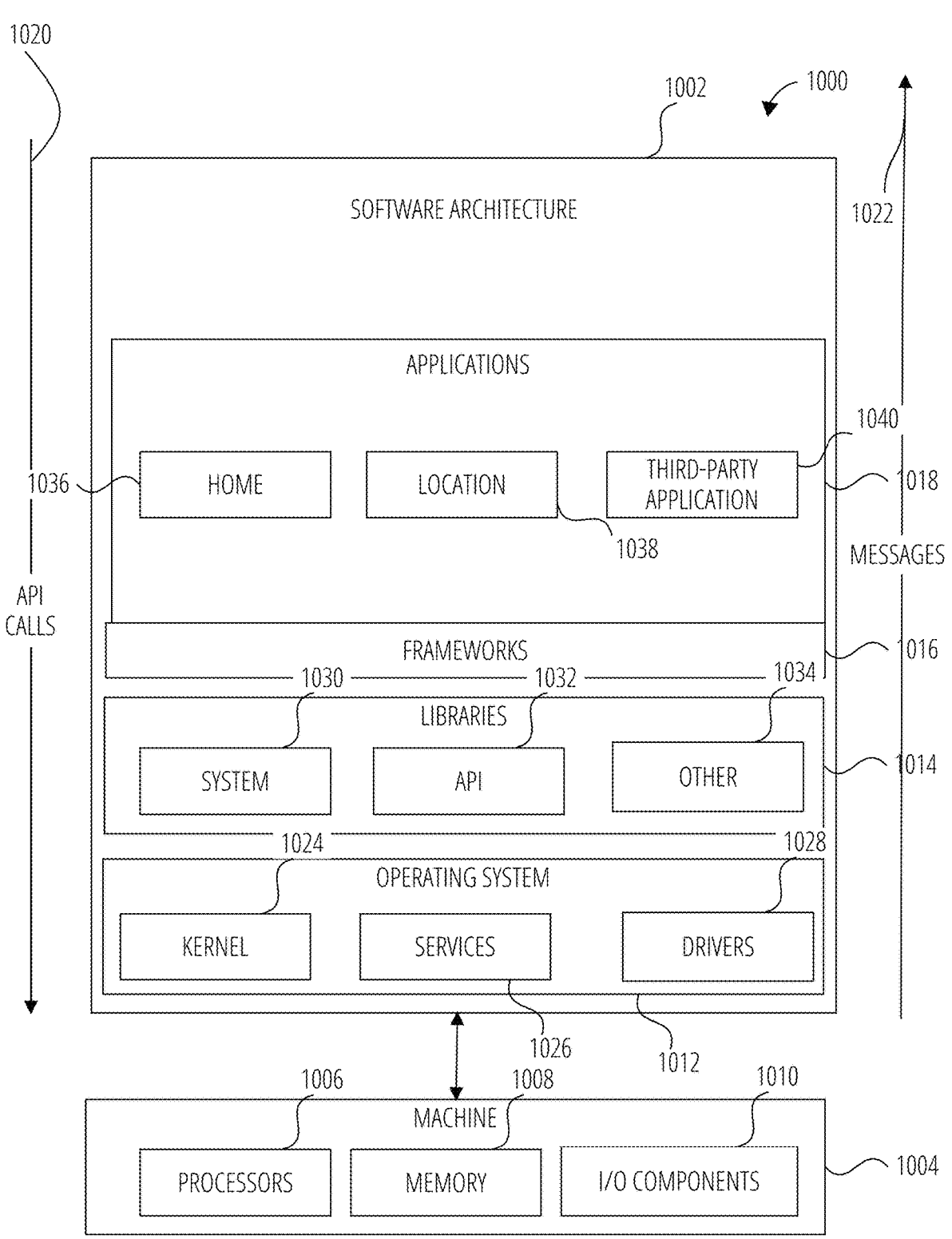
FIG. 10 is a block diagram showing a software architecture within which examples may be implemented.

FIG. 10 is a block diagram 1000 illustrating a software architecture 1002, which can be installed on any one or more of the devices described herein. The software architecture 1002 is supported by hardware such as a machine 1004 that includes processors 1006, memory 1008, and I/O components 1010. In this example, the software architecture 1002 can be conceptualized as a stack of layers, where each layer provides a particular functionality. The software architecture 1002 includes layers such as an operating system 1012, libraries 1014, frameworks 1016, and applications 1018. Operationally, the applications 1018 invoke API calls 1020 through the software stack and receive messages 1022 in response to the API calls 1020. The AE system 100 and Dynamic ROI system 102 thereof may be implemented by components in one or more layers of the software architecture 1002.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 provides memory management, processor management (e.g., scheduling), component management, networking, and security settings, among other functionalities. The services 1026 can provide other common services for the other software layers. The drivers 1028 are responsible for controlling or interfacing with the underlying hardware. For instance, the drivers 1028 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1014 provide a common low-level infrastructure used by the applications 1018. The libraries 1014 can include system libraries 1030 (e.g., C standard library) that provide functions such as memory allocation functions, string manipulation functions, mathematic functions, and the like. In addition, the libraries 1014 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1014 can also include a wide variety of other libraries 1034 to provide many other APIs to the applications 1018.

The frameworks 1016 provide a common high-level infrastructure that is used by the applications 1018. For example, the frameworks 1016 provide various graphical user interface (GUI) functions, high-level resource management, and high-level location services. The frameworks 1016 can provide a broad spectrum of other APIs that can be used by the applications 1018, some of which may be specific to a particular operating system or platform.

In an example, the applications 1018 may include a home application 1036, a location application 1038, and a broad assortment of other applications such as a third-party application 1040. The applications 1018 are programs that execute functions defined in the programs. Various programming languages can be employed to create one or more of the applications 1018, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1020 provided by the operating system 1012 to facilitate functionalities described herein.

Conclusion

Examples described herein may provide an AE system 100 and method for dynamically resizing ROIs for generating AE settings for a camera, based on motion of the ROIs relative to the FOV of the camera.

Example 1 is a method, performed by a processor, comprising: obtaining raw region of interest (ROI) information identifying a raw ROI, having a raw ROI size, within a first video frame captured by a camera; obtaining motion information representative of motion of the raw ROI relative to a field of view (FOV) of the camera; processing the raw ROI information and the motion information to generate a dynamic ROI having a dynamic ROI size larger than the raw ROI size; capturing a second video frame by the camera; and processing a portion of the second video frame defined by the dynamic ROI to generate autoexposure (AE) settings for the camera.

In Example 2, the subject matter of Example 1 includes, wherein: obtaining the motion information comprises: obtaining camera motion information representative of motion of the camera; and processing the camera motion information to generate the motion information.

In Example 3, the subject matter of Example 2 includes, wherein: the camera motion information comprises rotation information and translation information generated by an inertial measurement unit (IMU) configured to rotate and translate with the camera.

In Example 4, the subject matter of Examples 2-3 includes, wherein: the raw ROI information identifies the raw ROI within a first plurality of video frames captured by the camera, including the first video frame; obtaining the motion information further comprises processing the raw ROI information to generate ROI motion information representative of motion of the raw ROI within the FOV of the camera in the first plurality of video frames; and the motion information is generated by processing the ROI motion information and the camera motion information.

In Example 5, the subject matter of Examples 1-4 includes, wherein: the raw ROI information identifies the raw ROI within a first plurality of video frames captured by the camera, including the first video frame; and obtaining the motion information comprises: processing the raw ROI information to generate ROI motion information representative of motion of the raw ROI within the FOV of the camera in the first plurality of video frames; and processing the ROI motion information to generate the motion information.

In Example 6, the subject matter of Examples 1-5 includes, wherein: at least one additional video frame is captured by the camera after the first video frame and before the second video frame.

In Example 7, the subject matter of Examples 1-6 includes, wherein: the AE settings comprise a gain and an exposure time for the camera.

In Example 8, the subject matter of Examples 1-7 includes, wherein: the raw ROI information further identifies one or more additional raw ROIs, each having a respective raw ROI size; the motion information is further representative of motion of the one or more additional raw ROIs relative to the FOV of the camera; the raw ROI information and the motion information are further processed to generate, for each of the one or more additional raw ROIs, a respective additional dynamic ROI; and the AE settings are further generated by processing a respective portion of the second video frame defined by each respective dynamic ROI.

In Example 9, the subject matter of Examples 1-8 includes, wherein: the raw ROI is generated by a client; the raw ROI is located at a location of an object tracked by the client in the first video frame; the dynamic ROI size is enlarged relative to the raw ROI size based at least partly on a degree of motion of the object as represented by the motion information; and processing the portion of the second video frame defined by the dynamic ROI to generate the AE settings comprises: processing portions of the second video frame at the location of the object, as defined by the dynamic ROI, to generate AE settings configured to avoid underexposure or overexposure of the object in further video frames captured by the camera.

In Example 10, the subject matter of Examples 1-9 includes, wherein: the dynamic ROI is generated to have a dynamic ROI location different from a location of the raw ROI.

Example 11 is a system comprising: a processor; and a memory storing instructions that, when executed by the processor, configure the system to perform operations comprising: obtaining raw region of interest (ROI) information identifying a raw ROI, having a raw ROI size, within a first video frame captured by a camera; obtaining motion information representative of motion of the raw ROI relative to a field of view (FOV) of the camera; processing the raw ROI information and the motion information to generate a dynamic ROI having a dynamic ROI size larger than the raw ROI size; capturing a second video frame by the camera; and processing a portion of the second video frame defined by the dynamic ROI to generate autoexposure (AE) settings for the camera.

In Example 12, the subject matter of Example 11 includes, wherein: obtaining the motion information comprises: obtaining camera motion information representative of motion of the camera; and process the camera motion information to generate the motion information.

In Example 13, the subject matter of Example 12 includes, wherein: the camera motion information comprises rotation information and translation information generated by an inertial measurement unit (IMU) configured to rotate and translate with the camera.

In Example 14, the subject matter of Examples 12-13 includes, wherein: the raw ROI information identifies the raw ROI within a first plurality of video frames captured by the camera, including the first video frame; obtaining the motion information further comprises processing the raw ROI information to generate ROI motion information representative of motion of the raw ROI within the FOV of the camera in the first plurality of video frames; and the motion information is generated by processing the ROI motion information and the camera motion information.

In Example 15, the subject matter of Examples 11-14 includes, wherein: the raw ROI information identifies the raw ROI within a first plurality of video frames captured by the camera, including the first video frame; and obtaining the motion information comprises: processing the raw ROI information to generate ROI motion information representative of motion of the raw ROI within the FOV of the camera in the first plurality of video frames; and processing the ROI motion information to generate the motion information.

In Example 16, the subject matter of Examples 11-15 includes, wherein: at least one additional video frame is captured by the camera after the first video frame and before the second video frame.

In Example 17, the subject matter of Examples 11-16 includes, wherein: the AE settings comprise a gain and an exposure time for the camera.

In Example 18, the subject matter of Examples 11-17 includes, wherein: the raw ROI information further identifies one or more additional raw ROIs, each having a respective raw ROI size; the motion information is further representative of motion of the one or more additional raw ROIs relative to the FOV of the camera; the raw ROI information and the motion information are further processed to generate, for each of the one or more additional raw ROIs, a respective additional dynamic ROI; and the AE settings are further generated by processing a respective portion of the second video frame defined by each respective dynamic ROI.

In Example 19, the subject matter of Examples 11-18 includes, wherein: the raw ROI is generated by a client; the raw ROI is located at a location of an object tracked by the client in the first video frame; the dynamic ROI size is enlarged relative to the raw ROI size based at least partly on a degree of motion of the object as represented by the motion information; and processing the portion of the second video frame defined by the dynamic ROI to generate the AE settings comprises: processing portions of the second video frame at the location of the object, as defined by the dynamic ROI, to generate AE settings configured to avoid underexposure or overexposure of the object in further video frames captured by the camera.

Example 20 is a non-transitory computer-readable storage medium, the computer-readable storage medium including instructions that, when executed by a processor of a system, cause the system to perform operations comprising: obtaining raw region of interest (ROI) information identifying a raw ROI, having a raw ROI size, within a first video frame captured by a camera; obtaining motion information representative of motion of the raw ROI relative to a field of view (FOV) of the camera; processing the raw ROI information and the motion information to generate a dynamic ROI having a dynamic ROI size larger than the raw ROI size; capturing a second video frame by the camera; and processing a portion of the second video frame defined by the dynamic ROI to generate autoexposure (AE) settings for the camera.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Glossary

"Well exposed" or "properly exposed" refer to, for example, a state in which a subject or region within an image captured by a camera is neither overexposed nor underexposed. "Overexposed" and "underexposed" refer to a level of brightness or darkness, respectively, outside of the dynamic range of the camera.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multiprocessor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A method, performed by a processor, comprising:
obtaining raw region of interest (ROI) information identifying a raw ROI within a first video frame captured by a camera, the raw ROI being generated by a client, the raw ROI having a raw ROI size, and the raw ROI being located at a location of an object tracked by the client in the first video frame;
obtaining motion information representative of motion of the raw ROI relative to a field of view (FOV) of the camera;
processing the raw ROI information and the motion information to generate a dynamic ROI having a dynamic ROI size larger than the raw ROI size, the dynamic ROI size being enlarged relative to the raw ROI size based at least partly on a degree of motion of the object as represented by the motion information;
capturing a second video frame by the camera; and
processing a portion of the second video frame at the location of the object, as defined by the dynamic ROI, to generate autoexposure (AE) settings for the camera to avoid underexposure or overexposure of the object in further video frames captured by the camera.

2. The method of claim 1, wherein:
obtaining the motion information comprises:
obtaining camera motion information representative of motion of the camera; and processing the camera motion information to generate the motion information.

3. The method of claim 2, wherein:
the camera motion information comprises rotation information and translation information generated by an inertial measurement unit (IMU) configured to rotate and translate with the camera.

4. The method of claim 2, wherein:
the raw ROI information identifies the raw ROI within a first plurality of video frames captured by the camera, including the first video frame;
obtaining the motion information further comprises processing the raw ROI information to generate ROI motion information representative of motion of the raw ROI within the FOV of the camera in the first plurality of video frames; and
the motion information is generated by processing the ROI motion information and the camera motion information.

5. The method of claim 1, wherein:
the raw ROI information identifies the raw ROI within a first plurality of video frames captured by the camera, including the first video frame; and
obtaining the motion information comprises:
processing the raw ROI information to generate ROI motion information representative of motion of the raw ROI within the FOV of the camera in the first plurality of video frames; and
processing the ROI motion information to generate the motion information.

6. The method of claim 1, wherein:
at least one additional video frame is captured by the camera after the first video frame and before the second video frame.

7. The method of claim 1, wherein:
the AE settings comprise a gain and an exposure time for the camera.

8. The method of claim 1, wherein:
the raw ROI information further identifies one or more additional raw ROIs, each having a respective raw ROI size;
the motion information is further representative of motion of the one or more additional raw ROIs relative to the FOV of the camera;
the raw ROI information and the motion information are further processed to generate, for each of the one or more additional raw ROIs, a respective additional dynamic ROI; and
the AE settings are further generated by processing a respective portion of the second video frame defined by each respective dynamic ROI.

9. The method of claim 1, wherein:
the dynamic ROI is generated to have a dynamic ROI location different from a location of the raw ROI.

10. A system comprising:
a processor; and
a memory storing instructions that, when executed by the processor, configure the system to perform operations comprising:
obtaining raw region of interest (ROI) information identifying a raw ROI within a first video frame captured by a camera, the raw ROI being generated by a client, the raw ROI having a raw ROI size, and the raw ROI being located at a location of an object tracked by the client in the first video frame;

obtaining motion information representative of motion of the raw ROI relative to a field of view (FOV) of the camera;

processing the raw ROI information and the motion information to generate a dynamic ROI having a dynamic ROI size larger than the raw ROI size, the dynamic ROI size being enlarged relative to the raw ROI size based at least partly on a degree of motion of the object as represented by the motion information;

capturing a second video frame by the camera; and processing a portion of the second video frame at the location of the object, as defined by the dynamic ROI, to generate autoexposure (AE) settings for the camera to avoid underexposure or overexposure of the object in further video frames captured by the camera.

11. The system of claim 10, wherein:

obtaining the motion information comprises:

obtaining camera motion information representative of motion of the camera; and processing the camera motion information to generate the motion information.

12. The system of claim 11, wherein:

the camera motion information comprises rotation information and translation information generated by an inertial measurement unit (IMU) configured to rotate and translate with the camera.

13. The system of claim 11, wherein:

the raw ROI information identifies the raw ROI within a first plurality of video frames captured by the camera, including the first video frame;

obtaining the motion information further comprises processing the raw ROI information to generate ROI motion information representative of motion of the raw ROI within the FOV of the camera in the first plurality of video frames; and the motion information is generated by processing the ROI motion information and the camera motion information.

14. The system of claim 10, wherein:

the raw ROI information identifies the raw ROI within a first plurality of video frames captured by the camera, including the first video frame; and obtaining the motion information comprises:

processing the raw ROI information to generate ROI motion information representative of motion of the raw ROI within the FOV of the camera in the first plurality of video frames; and processing the ROI motion information to generate the motion information.

15. The system of claim 10, wherein:

at least one additional video frame is captured by the camera after the first video frame and before the second video frame.

16. The system of claim 10, wherein:

the AE settings comprise a gain and an exposure time for the camera.

17. The system of claim 10, wherein:

the raw ROI information further identifies one or more additional raw ROIs, each having a respective raw ROI size;

the motion information is further representative of motion of the one or more additional raw ROIs relative to the FOV of the camera;

the raw ROI information and the motion information are further processed to generate, for each of the one or more additional raw ROIs, a respective additional dynamic ROI; and the AE settings are further generated by processing a respective portion of the second video frame defined by each respective dynamic ROI.

18. A non-transitory computer-readable storage medium, the computer-readable storage medium including instructions that, when executed by a processor of a system, cause the system to perform operations comprising:

obtaining raw region of interest (ROI) information identifying a raw ROI within a first video frame captured by a camera, the raw ROI being generated by a client, the raw ROI having a raw ROI size, and the raw ROI being located at a location of an object tracked by the client in the first video frame;

obtaining motion information representative of motion of the raw ROI relative to a field of view (FOV) of the camera;

processing the raw ROI information and the motion information to generate a dynamic ROI having a dynamic ROI size larger than the raw ROI size, the dynamic ROI size being enlarged relative to the raw ROI size based at least partly on a degree of motion of the object as represented by the motion information;

capturing a second video frame by the camera; and processing a portion of the second video frame at the location of the object, as defined by the dynamic ROI, to generate autoexposure (AE) settings for the camera to avoid underexposure or overexposure of the object in further video frames captured by the camera.

19. The non-transitory computer-readable storage medium of claim 18, wherein:

obtaining the motion information comprises:

obtaining camera motion information representative of motion of the camera; and processing the camera motion information to generate the motion information.

20. The non-transitory computer-readable storage medium of claim 19, wherein:

the camera motion information comprises rotation information and translation information generated by an inertial measurement unit (IMU) configured to rotate and translate with the camera.

* * * * *